United States Patent [19]

Coen et al.

[11] Patent Number: 5,586,644

[45] Date of Patent: Dec. 24, 1996

[54] CHAIN CONVEYOR HAVING IMPROVED RUNNING FEATURES

[75] Inventors: Daniele Coen, Villasanta; Carlo Garbagnati, Castello Brianza, both of Italy

[73] Assignee: Regina Sud S.p.A., Latina, Italy

[21] Appl. No.: 545,097

[22] Filed: Oct. 19, 1995

[30] Foreign Application Priority Data

Nov. 8, 1994 [IT] Italy .................................. MI940731 U

[51] Int. Cl.⁶ .................................................. B65G 17/06
[52] U.S. Cl. ............................ 198/853; 198/850; 198/852
[58] Field of Search ........................................ 198/837, 841, 198/850, 851, 852, 853

[56] References Cited

U.S. PATENT DOCUMENTS

| | | | |
|---|---|---|---|
| 3,944,059 | 3/1976 | Garvey | 198/850 |
| 4,576,277 | 3/1986 | Park et al. | 198/853 X |
| 5,031,757 | 7/1991 | Draebel et al. | 198/852 |
| 5,217,110 | 6/1993 | Spangler et al. | 198/853 X |
| 5,439,751 | 8/1995 | Fesler | 198/853 X |

*Primary Examiner*—James R. Bidwell
*Attorney, Agent, or Firm*—Watson Cole Stevens Davis, P.L.L.C.

[57] ABSTRACT

A link (11, 111, 211) for a chain conveyor running along a guide (12, 112, 212) comprises at least one sliding surface moving on the guide. At least part (25, 125, 225) of the sliding surface belongs to a sliding element (24, 124, 224) fastened to the link. The sliding element is advantageously removable for replacement.

4 Claims, 4 Drawing Sheets

CHAIN CONVEYOR HAVING IMPROVED RUNNING FEATURES

BACKGROUND OF THE INVENTION

The present invention relates to the links of a chain conveyor.

In the known art conveyors are well known which comprise a plurality of interconnected links to define an articulated transportation plane, running along appropriate guides. Each link comprises one transversely-extended plate running on the conveyor guide and the upper side of which embodies the transportation plane.

In order to enable the installation to run smoothly, a friction limitation between the links and the guide is important. In addition, wear in the sliding parts must be also limited. There is therefore a tendency to make the guides of metal or plastic material having good qualities in terms of smoothness and resistance to wear. As regards links, the material selection is an important problem complicated by the necessity to combine in a single material, a high mechanical strength and good features in terms of smoothness and reduced wear.

In addition, the quality of the plastic material is restricted since it is obviously necessary to limit costs for the links.

At all events, good-quality products are subjected to wear too in the long run and it is therefore necessary to replace entire chain stretches, which involves costs.

It is a general object of the present invention to obviate the above mentioned drawbacks by providing links for conveyors of easy and cheap manufacture, while offering improved smoothness and resistance to wear.

SUMMARY OF THE INVENTION

In view of the above object, in accordance with the invention a link for a chain conveyor running along a guide has been devised, which comprises at least one sliding surface moving on the guide, characterized in that at least part of the sliding surface belongs to a sliding element fastened to the link. The sliding element is advantageously removable for replacement.

BRIEF DESCRIPTION OF THE DRAWINGS

For better explaining the innovatory principles of the present invention and the advantages it offers over the known art, a possible embodiment applying said principles is described hereinafter by way of non-limiting example, with the aid of the accompanying drawings, in which.

With reference to the drawings, a transporting installation 10 according to the invention comprises a plurality of links 11 hinged with each other to form a chain conveyor.

DETAILED DESCRIPTION OF THE INVENTION

Figure 2:
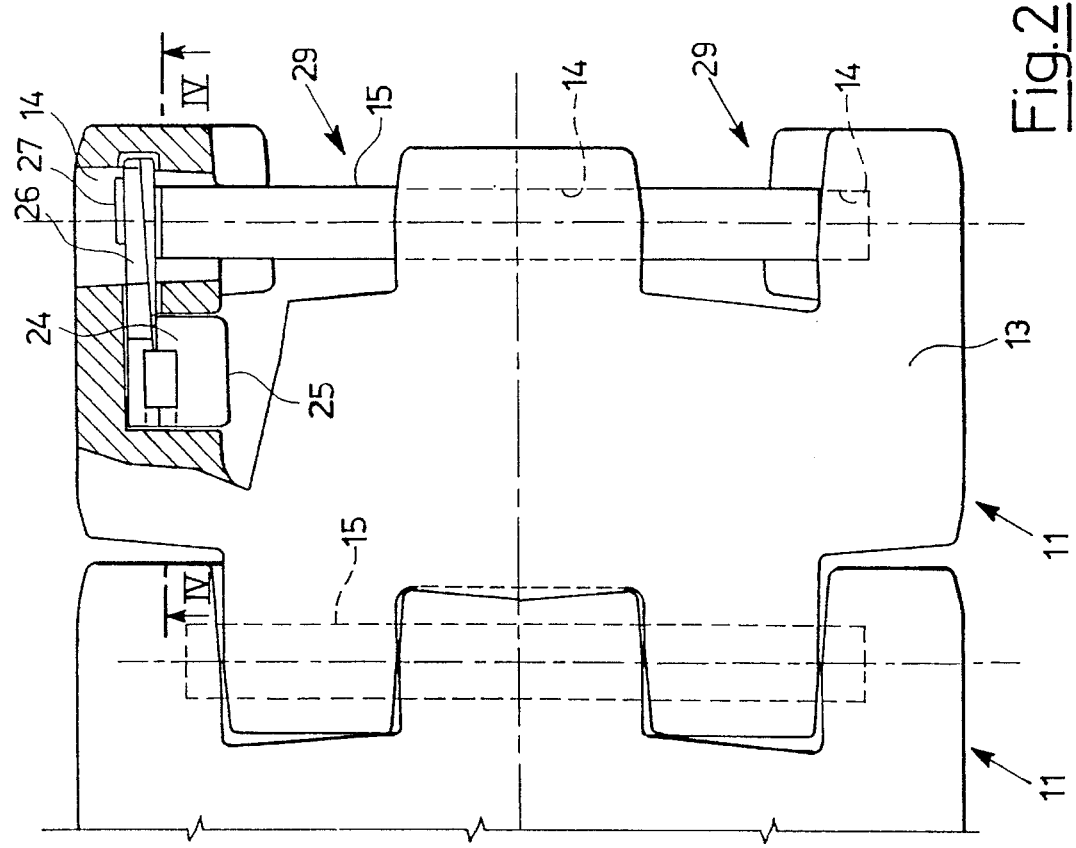
FIG. 2 is a partial top plan view, partly in section, of conveyor links as shown in FIG. 1.

As viewed from FIG. 2, each link comprises an upper transportation plane 13 and transverse housings 14 to receive pivot pins 15 for interconnection with other similar links.

Figure 3:
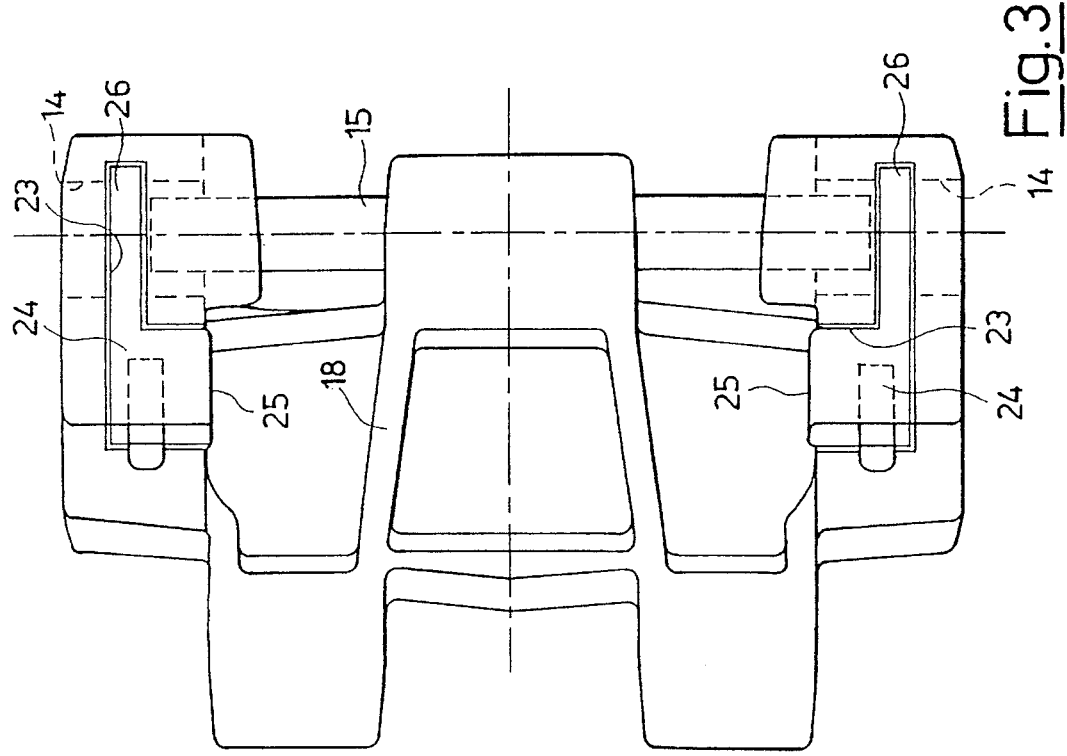
FIG. 3 is a bottom plan view of one link of FIG. 2.

Each link further comprises at least one surface 16 resting and sliding on a corresponding upper support surface 17 of a guide 12. Obviously, by "resting surface" it is herein also intended a plurality of discontinuous resting elements defining a generic resting and sliding plane, such as ribs 18 for example, as shown in FIG. 3. Link 11, close to its side ends, comprises blocks 20 projecting downwardly to define a passageway 22 between each other for receiving at least part of the guide so that the support and slide surface 17 is comprised in the passageway.

Corresponding teeth 19 facing each other and directed towards each other in a direction transverse to the link, project from blocks 20. The guide, at least some portions thereof on its body portion received in the passageway 22 and defining the slide surface 17 by its upper side, comprises at least one side projection 21 under which the teeth will be fitted so as to form a slidable engagement along the guide.

The guide portion shown is for example a turning portion wherein one projection 21 for retention of the links is only necessary on the external side thereof.

Figure 1:
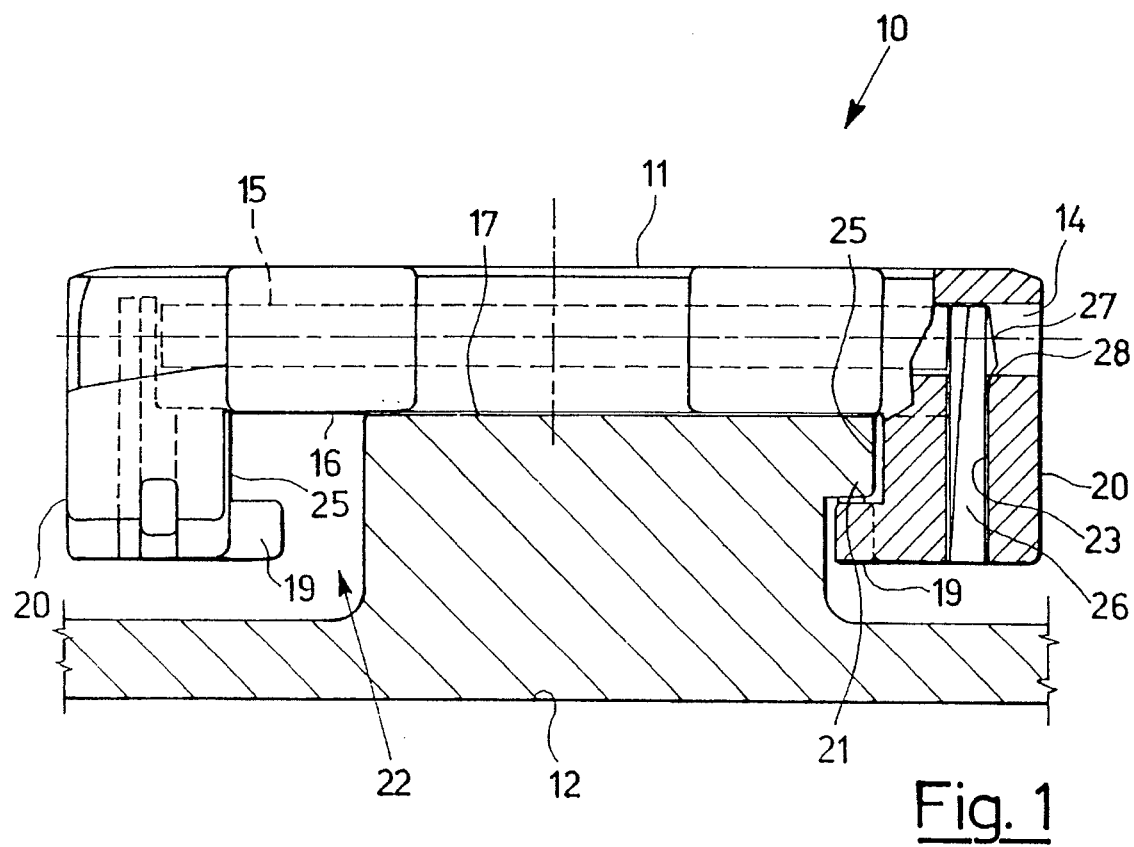
FIG. 1 is a view of a first link made according to the invention, taken in a plane transverse to the carrying direction.
Figure 4:
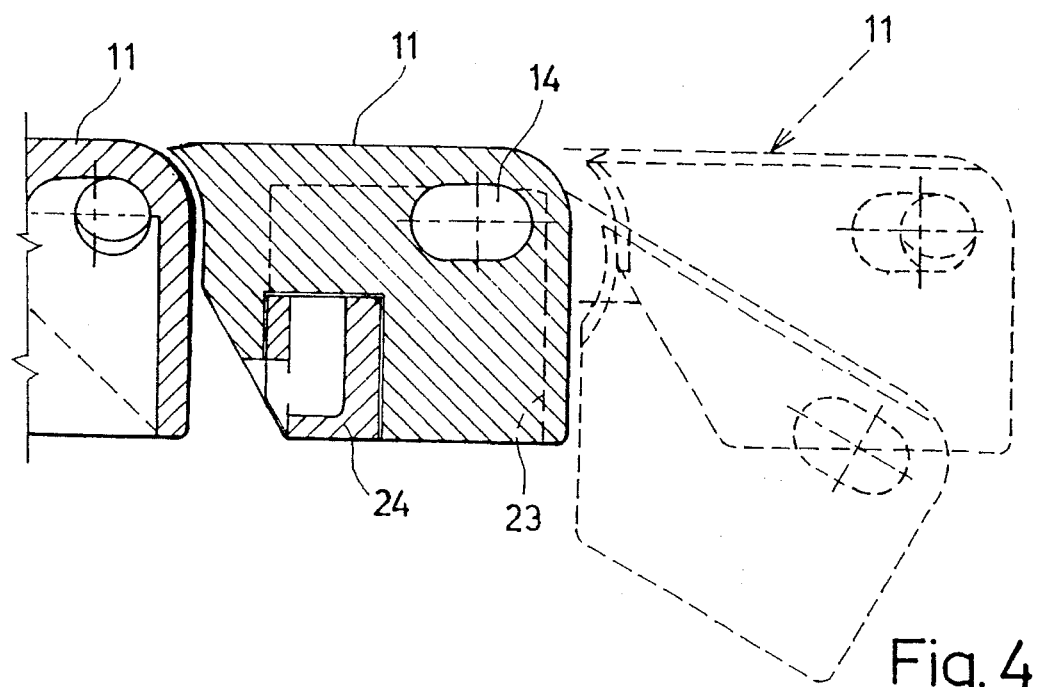
FIG. 4 is a partly sectional side view of the links, taken along line IV—IV in FIG. 2.

As shown in FIG. 1, to make the link in an easy manner by moulding, the teeth 19 are disposed below the transportation plane 13 at a position facing gaps in said transportation surface. Thus the teeth can be manufactured without producing undercuts, moulding of which is difficult and complicated.

Advantageously, said gaps correspond to spaces 29 opened in the pin housings and designed to receive articulation portions conforming to the other links, as clearly appears from Fig. 2 showing two hinged links 11.

According to the present invention, seatings 23 are present in the side walls of the passageway 22, that is the inner surfaces of blocks 20; said seatings 23 receive elements or inserts 24, slightly projecting into the passageway 22, so as to form side sliding surfaces 25 of the links on the guide.

It has been noticed in fact that the greatest cause for friction and wear in chain conveyors is represented by the high specific pressures generated at lateral slide contact points on curves. Elements 24 can be made of a material having excellent features in terms of smoothness and/or resistance to wear, so that the conveyor performance is greatly improved.

In addition, inserts 24 can be fixed to the link in a removable manner, by appropriate snap fitting of known type or interference fitting, so that they can be easily replaced when worn.

As clearly shown in FIGS. 2 and 3, the sliding elements 24 can be provided to advantage with extensions 26 capable of closing the housings 14 for introduction of the pins between the links, so that slipping off of the pins from said housings 14 is prevented. Thus inserts 24 perform a dual function as they offer sliding surfaces and locking means for the pivot pins.

As viewed from FIG. 3, for an easy and safe positioning of the inserts, seatings 23 are open downwardly of the link for introduction of the sliding elements from below, said seatings transversely intersecting the pin housings 14. In this manner, the locking force of the insert in the seating should not counteract possible axial sliding forces of the respective pin. Thus the fitting system between the pin and the seating can be of low force and therefore can be easily managed for assembling and disassembling. For example, as shown in FIG. 1, the sliding elements 24 can have teeth 27 for locking into the seatings 23, into which teeth an edge 28 formed of the intersection between the seating and the respective pin housing 14 is snap fitted. For an easy introduction of the insert, each tooth 27 can have a tapering shape in the fitting direction.

Figure 5:
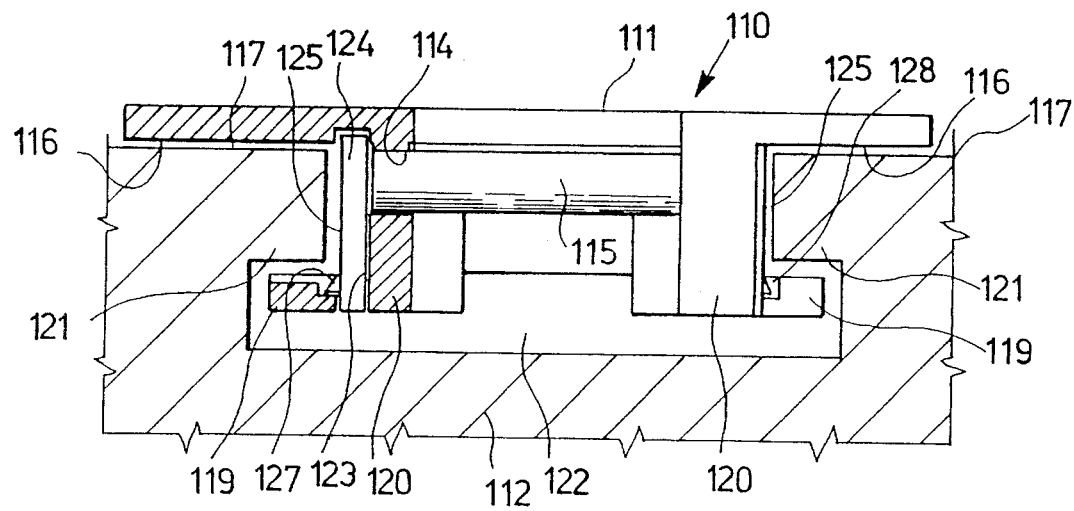
FIG. 5 is a view of a second link made according to the invention, taken in a plane transverse to the carrying direction and partly sectioned along line V—V in FIG. 7.
Figure 6:
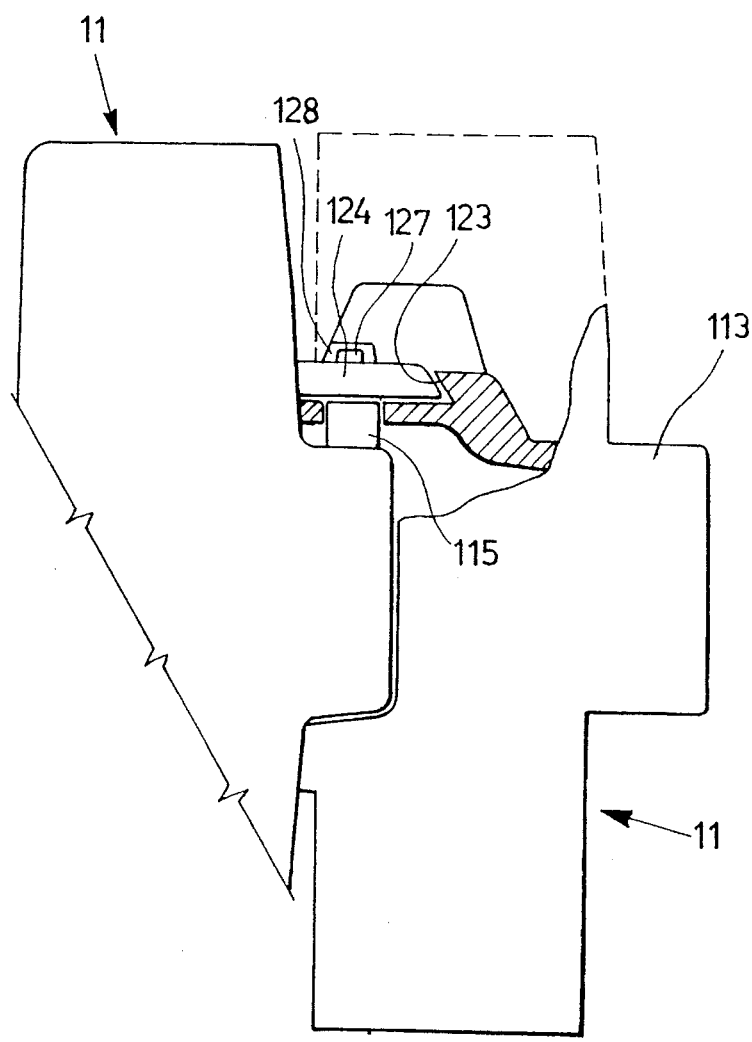
FIG. 6 is a partial upper plan view of links as shown in FIG. 5, partly sectioned along line VI—VI in FIG. 7.
Figure 7:
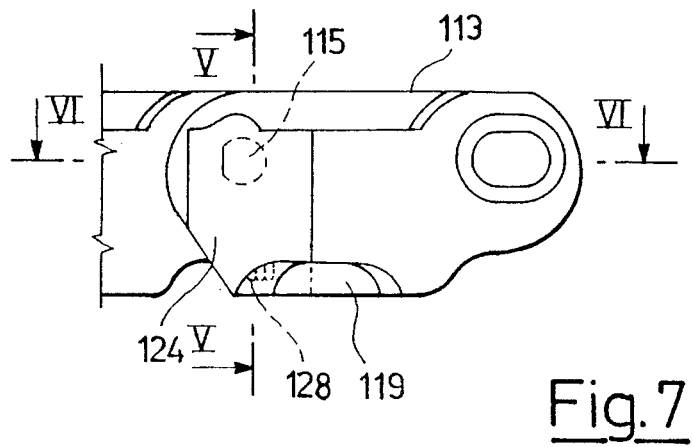
FIG. 7 is a side view of the links shown in FIG. 5.

An alternative embodiment of the installation with links according to the invention is shown in FIGS. 5–7. For the sake of simplicity in this alternative form the link components have been allocated the same reference numerals as in FIGS. 1–4, increased by 100.

There is an installation 110 consisting of a plurality of links 111 hinged with each other to form a chain conveyor running on a guide 132o Each link comprises an upper transportation plane 113 and transverse housings 114 to receive pivot pins 115 for connection with other similar links. Each link rests with its lower side surfaces 116 on corresponding upper support surfaces 117 of the guide 112. At a lower position between the support surfaces, the link 111 comprises blocks 120 from which corresponding teeth 119 project laterally outwardly. Therefore, the link section at its lower portion substantially has the form of an inverted T which is received in a guide passageway 122. The guide, at least at some portions thereof, can have projections 121 extending inwardly of the passageway so that the teeth 119 are fitted under it to avoid lifting of the link chain.

According to the present invention, seatings 123 are present in the side walls of the blocks 120 towards the side slide surfaces of the guide 112, in which seatings elements or inserts 124 are received, said elements slightly projecting from the side walls, so as to form side sliding surfaces 125 of the links on the guide. Elements 124 can be made of a material having high features in terms of smoothness and/or resistance to wear. For a removable fixing of the inserts 124, seatings 123 are open at the lower part of the link for introduction of the sliding elements thereinto, from below. As shown in FIG. 6, the seatings and inserts widen inwardly from the side face of the blocks 120, so as to prevent lateral withdrawal of the inserts. In order to lock the insert in its seating, as shown in FIG. 1, said insert can be provided with one tooth 127 to be fitted in a recessed abutment 128 on the upper surface of the corresponding tooth 119. For easy introduction of the insert, the tooth 127 can have a tapered form in the insert-fitting direction.

As clearly viewed from the figures, the seating 123 receiving the insert is so disposed as to transversely cut the pin housing so that the introduction of the two inserts locks the pin in place, said pin abutting by its ends on the inner walls of the inserts.

Figure 8:
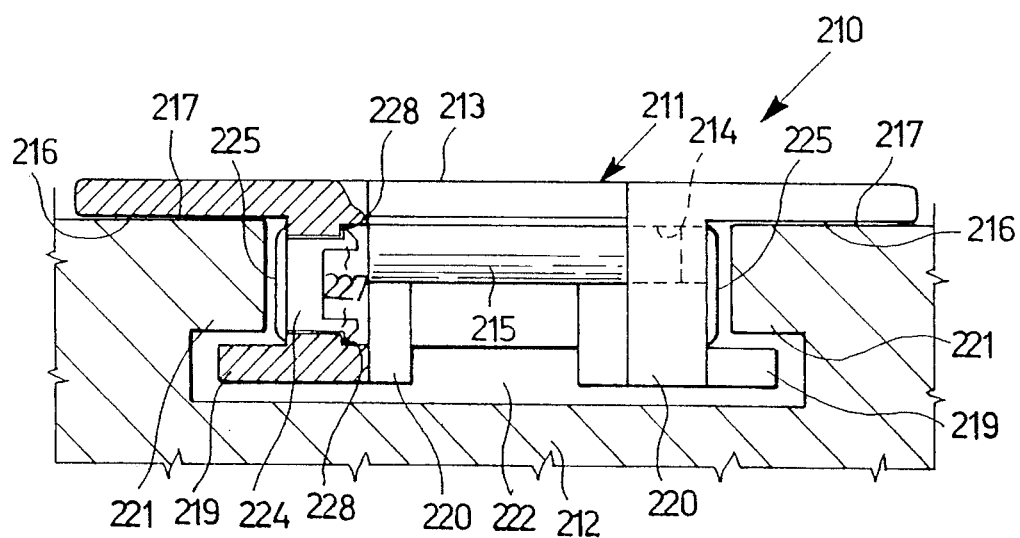
FIG. 8 is a view of a third link made according to the invention, taken in a plane transverse to the carrying direction and partly sectioned along line VIII—VIII in FIG. 9.
Figure 9:
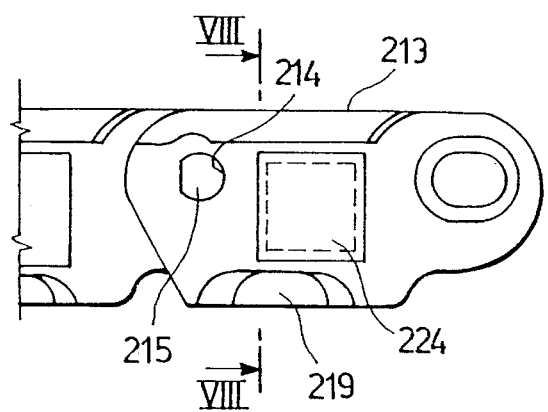
FIG. 9 is a side view of the links shown in FIG. 8.

Shown in FIGS. 8–9 is an alternative embodiment of the links of FIGS. 5–7. For the sake of simplicity, for this solution the link components have been allocated the same reference numerals as in FIGS. 5–7, increased by 100. These figures show an installation 210 consisting of a plurality of links 211 provided with a transportation plane 213, articulated with each other by pivot pins 215 received in transverse housings 214 and sliding on a guide 212. Each link rests with its lower side surfaces 216 on corresponding upper support surfaces 217 of the guide 212. The link 211 is provided at its lower part with blocks 220 from which corresponding teeth 219 project outwardly in an inverted T configuration, being received in a passageway 222 of the guide. At least at some portions of the guide can have projections 221 for coupling with the teeth 219.

The side walls of the blocks 220 towards the side slide surfaces of the guide 212 have seatings 223 into which elements or inserts 224 are received, said inserts slightly projecting from the side walls so as to form the side sliding surfaces 225 of the links on the guide. For a removable fastening of the inserts 224, said inserts are provided with rear teeth 227 projecting outwardly to be interfitted with abutments 228 on the side walls of the seatings. Inserts 224 have a head projecting from the respective enlarged seating so that an excessive penetration into the seating itself is avoided.

Inserts 224 thus enter the seatings like plugs providing side sliding surfaces for the link by their heads. In this embodiment these inserts do not perform the function of locking the pivot pins, which function therefore must be achieved by known methods, such as an interference fitting between the pin and the respective housing.

At this point it is apparent that the intended purposes have been achieved, since links are provided which have features of high stability and smoothness and easy assembling/ disassembling, said links being in addition provided with replaceable anti friction parts. Furthermore, the anti friction parts are of limited sizes and can be made of valuable materials of appropriate features, without greatly increasing the guide costs. In addition, the possibility exists of locking the pins by the inserts themselves.

Obviously, the above description applying the innovatory principles of the invention is given for purposes of illustration only and therefore must not be considered as a limitation of the scope of the invention as herein claimed.

For example, the exact shape and proportion of the different elements will depend on the particular practical requirements.

In addition, the different features of the three embodiments shown can be interchanged with each other; for example a system for locking the insert in the pivot housing or hole as shown in FIG. 1 can be provided for the embodiment of FIG. 5.

Finally, the positions of the sliding surfaces can be different from those shown in order to come into contact with other guide portions.

What is claimed is:

1. A link for a chain conveyor running along a guide comprising at least one sliding surface for moving on a said guide, with at least part of said sliding surface being a sliding element carried by said link;

said link having a transverse housing for receiving a pivot pin to enable articulation with a similar link;

said sliding element comprising a plug for fitting into a seating which transversely intersects said pivot pin housing;

said sliding element having teeth for locking into the seating, said teeth snap interfitting with an abutment edge formed by an intersection between the seating and its associated pivot pin housing.

2. A link for a chain conveyor running along a guide comprising at least two sliding surfaces for moving on said guide, with at least a part of said sliding surfaces being sliding elements carried by said link to slide along corresponding side surfaces of the guide;

at least two seatings for receiving said sliding elements in a direction normal to the sliding surface;

said sliding elements having, at a rear part thereof, teeth for snap interfitting with an abutment edge on a seating sidewall.

3. A link for a chain conveyor running along a guide comprising at least one sliding surface for moving on said guide, with at least part of said sliding surface being a sliding element carried by said link;

said link comprising teeth projecting toward each other in a direction transverse to the link to define a passageway between said teeth for reception of at least a part of said guide, said teeth being shaped and positioned to fit under corresponding projections of said at least part of said guide to form a slidable engagement with said projections;

said sliding elements having at least part of their sliding surface projecting inwardly from sidewalls of said passageway to form a side rest for the link on the guide.

4. A link for a chain conveyor running along a guide comprising at least one sliding surface for moving on said guide, with at least part of said sliding surface being a sliding element carried by said link;

said link comprising teeth projecting laterally on opposite sides of the link to define, transversely of the link, an inverted T shaped configuration;

said guide having a longitudinal passageway with projections corresponding to said inverted T shape configuration so that said teeth fit under said projections to form a slidable engagement along said guide, the sliding elements having at least part of their sliding surface projecting inwardly of the passageway to form a side rest for the link on the guide.

* * * * *